March 15, 1927. 1,621,036
M. SUZUKI
LOCK
Filed May 11, 1925

INVENTOR,
Masuichi Suzuki;
BY Blakeslee & Brown
ATTORNEYS.

Patented Mar. 15, 1927.

1,621,036

UNITED STATES PATENT OFFICE.

MASUICHI SUZUKI, OF LOS ANGELES, CALIFORNIA.

LOCK.

Application filed May 11, 1925. Serial No. 29,448.

This invention relates to locks, and particularly to an automobile steering wheel lock. The invention has for an object the provision of a lock which will either connect or disconnect the steering wheel from the steering wheel column so that the steering wheel may either function to guide the car or be out of operation.

The invention has for a further object the provision of a lock which is sightly in appearance, cannot get out of order, and which is difficult to tamper with.

At the present time it is customary to provide some form of lock for automobiles to prevent theft of the same, and locks have been provided for steering wheels which permit the steering wheels to rotate without operating the steering mechanism. The present invention includes a permutation lock for this purpose and which is adapted to be secured to the steering wheel shaft. Its appearance is such that it does not attract attention and as a consequence, thieves, unless they were familiar with this type of lock, would not discover the same upon the top of the steering wheel hub. A permutation lock is more difficult to operate than the ordinary form of key lock, and for this reason it is superior to the key lock.

The invention has for further objects an improved device of the character stated which will be superior in point of relative simplicity and inexpensiveness, taken in conjunction with efficiency, serviceability and durability.

With the above and other objects in view, the invention consists in the novel and useful provision, formation, construction, association and relative arrangement of parts, members and features, all as shown in certain of its embodiments in the accompanying drawing, described generally and more particularly pointed out in the claims.

In the drawing.

Corresponding parts in all the figures are designated by the same reference characters.

Figure 1:
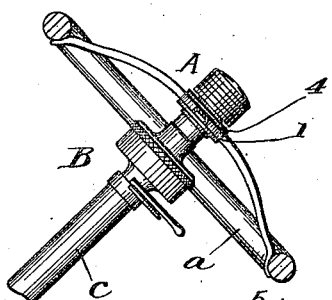
Figure 1 is a fragmentary partially sectional view of the steering wheel column and wheel with the improved lock in position.

Referring with particularity to the drawing, the improved lock is designated as an entirety and in one embodiment by A, and the steering wheel column with which such lock is adapted to be associated, is designated as B. The steering wheel column B includes a steering wheel $a$ carried upon a shaft $b$, which shaft is encased by a member $c$. Ordinarily, the steering wheel hub 1 is keyed to the shaft, the shaft in this particular being grooved as shown at 2, so that a key member fits within said groove 2 and a groove 3 in the wheel hub 1. Thus, rotation of the wheel $a$ will produce movement in the shaft $b$. The lock A is adapted to be placed on the top of the wheel hub 1, as shown in Figure 1 at 4.

Said lock A includes a plurality of tumblers $d$ and a cap member $e$. One of the tumblers $d$, as shown at 5, is fixed to the shaft $b$ by means of a pin 6 transversely passed through said tumbler shown at 5 and the shaft $b$. The remaining tumblers between the fixed tumbler and the cap $e$ are movable.

Figure 3:
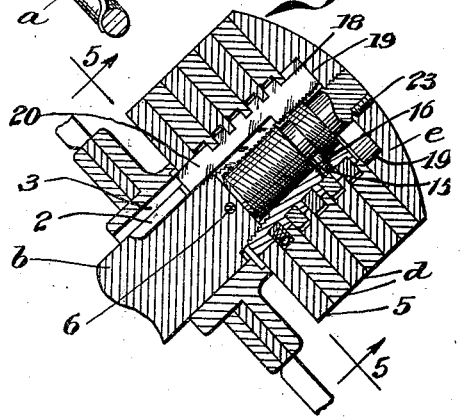
Figure 3 is a cross sectional view of the improved lock.
Figure 2:
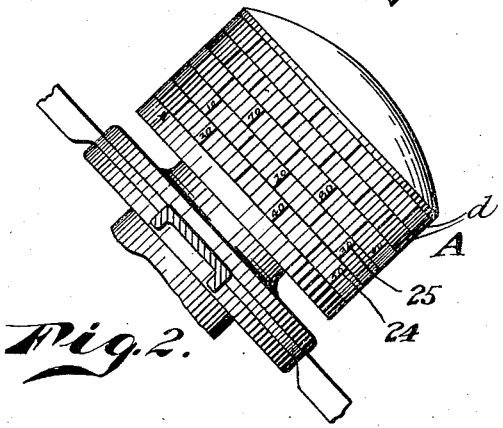
Figure 2 is a fragmentary partially sectional view on an enlarged scale and showing the lock in association with the steering wheel column.
Figure 5:
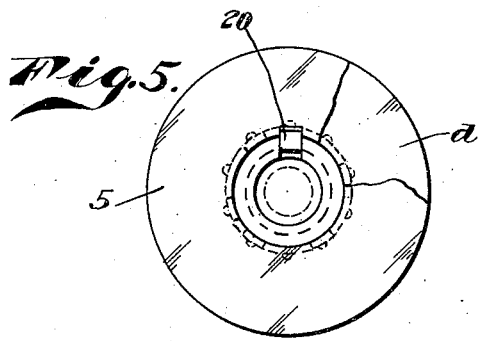
Figure 5 is a view on the line 5—5 of Figure 3.
Figure 4:
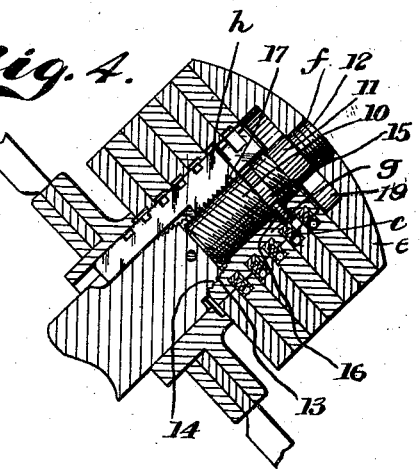
Figure 4 is a view similar to Figure 3 and showing the position of a key member controlled by movement of certain elements of the lock.
Figure 7:
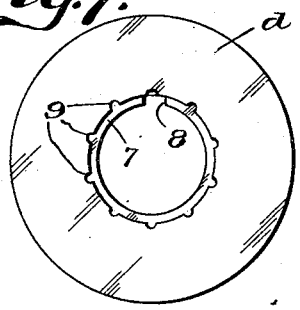
Figure 6:
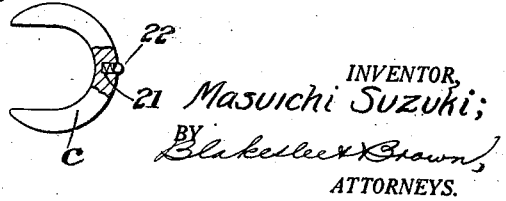
Figure 6 is a view, certain parts being in section, of means for determining the point of rotation of certain of the elements of the lock; and, Figure 7 is a plan view of one of the tumblers.

Figure 7 illustrates one of the tumblers and each tumbler is annular in formation and likewise formed with an inner annular flange which is not as thick as the body of the tumbler. The said flange 7 is cut away as shown at 8 to form a small groove. The inner annular wall of the tumblers bounding the flange portion 7 is provided with a plurality of spaced notches 9. A member $f$ provided with screw threads 10 and also provided with a portion of reduced diameter 11 which is also screw-threaded as shown at 12, has a split bushing $g$ surrounding the screw threads 10. The said bushing is provided with an internally tapered bore which is screw-threaded, as shown at 13 for engagement with threads 14 on an end of the shaft $b$. The member $f$ is provided with an annular groove 15 and a key 16 is passed through said bushing and is received within the annular groove 15. Thus the bushing is prevented from moving from the member $f$. A key $h$ provided with a screw-threaded portion 17 is adapted to engage the screw threads 10 of the member $f$. Said key lies within the split portion of the bushing 2. The key is provided with a plurality of spaced notches 18, said flanges 7 of the tumbler $d$ when assembled, as shown in Figure 3, being received in the said notches 18. It is also noted that the cap $e$ is annularly grooved as shown at 19 so that the head of the key may be received therein when the steering wheel is out of direct connection with the shaft $b$ which occurs when the portion 20 of such key rests in such a position as to be out of engagement with the groove 3 of the steering wheel hub and the groove 2 in the shaft. When, however, the tumblers have been properly turned so that the cut away or grooved portions 8 thereof all lie in alignment with the key, the key can be moved, as shown in Figure 4, so as to have the part 20 between the slots 2 and 3 and thus movement of the steering wheel will produce movement of the shaft $b$. Each tumbler $d$ carries upon the flange 7 a washer $c$ such as shown in Figure 6, and such washers are bored as shown at 21 so as to confine ball detents designated generally as 22, the ball portions of which are adapted for reception in the notches 9. When the tumblers have been properly turned to align the cut-away portions 8 with the key, a turning of the cap $e$ will rotate the member $f$ and the key will be caused to travel along the threaded portion 10 of the member $f$, either to lock or unlock the steering wheel from the shaft. The cap $e$ is keyed by suitable means 23 to the head. The tumblers are provided on their peripheries with suitable markings as shown at 24 and likewise with suitable indicia for designating such markings so that the combination may be readily worked by anyone knowing the combination of numbers necessary for operating the lock.

The operation and method of assembling the device is as follows:

The split bushing $g$ has confined within the same the member 10, which member is secured to the cap $e$. The bushing carries a small key which is received in the groove 15 of the member 10 so that so far as the bushing is concerned the same may rotate around and around on the member 10 and still be held to such member. The key $h$ has its tooth portion in engagement with the threads of the member 10 and such key is confined within the split portion of the bushing, said split portion acting as a keyway for the key. One tumbler at a time is now assembled on the bushing and each tumbler as it is assembled has one of the washers $c$ placed within the inner annular space of the same so that it bears against the flange 7, the leg portions of such washer $c$ straddling opposite sides of the key $h$. In order to properly assemble the tumblers the tumblers must be turned so that the cut-away portion or slot 8 will be in alignment with the key $h$. After all the tumblers have been assembled on the bushing, the final tumbler, which does not carry a $c$ washer, is placed on the bushing. The bushing is then screw-threaded upon the end of the shaft $b$ and the final tumbler member is pinned to the shaft $b$. So long as the slots 8 of the various tumblers are in alignment the key $h$ may be moved upon rotating the cap $e$. The flange portions 7 of the tumblers fit within cut-away portions of the key when the key is locked against movement.

The device is very simple in nature and yet very efficient. Where a number of tumblers are used it is a very difficult matter to determine a combination, and the average petty thief would be unable to operate the lock.

It is obvious that various changes and modifications may be made in practicing the invention, in departure from the particular showing of the drawing, without departing from the true spirit of the invention.

Having thus disclosed my invention, I claim and desire to secure by Letters Patent:

1. Improvements in permutation locks, including a screw-threaded member, a split bushing keyed to said screw-threaded member, a key within the split portion of said bushing and in screw-threaded engagement with the screw-threaded member, tumblers surrounding the key and bushing, said tumblers being annular in formation and provided with annular flanges, said key being provided with spaced notches, and said annular flanges of said tumblers being adapted to be received in said spaced notches when the key is in a given position, one of said tumblers being fixed against rotation, a cap member secured to the said screw-threaded member and the other of said tumblers being interposed between said fixed tumbler and the said cap.

2. Improvements in permutation locks, adapted to be mounted upon a shaft to be turned, including a screw-threaded member, a split bushing surrounding said screw-threaded member, said bushing being secured to the shaft to be turned, said screw-threaded member being rotatably secured to the said bushing, a key within the split portion of the bushing and in screw-threaded engagement with the screw-threaded member, a cap member secured to an end of said screw-threaded member and whereby a turning of the said cap member will produce movement of the key within the split portion of the bushing, and tumblers surrounding the said key and bushing and in engagement with the said key and whereby a proper setting of the said tumblers will permit movement of the screw-threaded member to move the key.

3. Improvements in permutation locks, adapted to be mounted upon a shaft to be turned, including a screw-threaded member, a split bushing surrounding said screw-threaded member, said bushing being secured to the shaft to be turned, said screw-threaded member being rotatably secured to the shaft to be turned, said screw-threaded member being rotatably secured to the said bushing, a key within the split portion of the bushing and in screw-threaded engagement with the screw-threaded member, a cap member secured to an end of said screw-threaded member and whereby a turning of the said cap member will produce movement of the key within the split portion of the bushing, tumblers surrounding the said key and bushing and in engagement with the said key and whereby a proper setting of the said tumblers will permit movement of the screw-threaded member to move the key; said tumblers being annular in form, and each thereof provided with an inner flange, washer members provided with detents received on said inner annular flanges whereby the said tumblers may be maintained in given rotative positions.

4. Improvements in permutation locks, adapted to be mounted upon a shaft to be turned, including a screw-threaded member, a split bushing surrounding said screw-threaded member, said bushing being secured to the shaft to be turned, said screw-threaded member being rotatably secured to the said bushing, a key within the split portion of the bushing and in screw-threaded engagement with the screw-threaded member, a cap member secured to an end of said screw-threaded member whereby a turning of the said cap member will produce movement of the key within the split portion of the bushing, tumblers surrounding the said key and bushing and in engagement with the said key whereby a proper setting of the said tumblers will permit movement of the screw-threaded member to move the key; said tumblers being annular in form, and each thereof provided with an inner annular flange, washer members provided with detents received on said inner annular flanges whereby the said tumblers may be maintained in given rotative positions; said washers being U-shaped and adapted to straddle opposite sides of said key.

In testimony whereof, I have signed my name.

MASUICHI SUZUKI.